(12) United States Patent
Xu et al.

(10) Patent No.: US 9,521,498 B2
(45) Date of Patent: Dec. 13, 2016

(54) ASSEMBLING METHOD FOR MICRO-LOUDSPEAKER ASSEMBLY

(71) Applicant: GOERTEK INC., WeiFang (CN)

(72) Inventors: Chao Xu, WeiFang (CN); Shengping Li, WeiFang (CN); Zongjun Mou, WeiFang (CN)

(73) Assignee: GOERTEK INC., Weifang (CN)

( * ) Notice: Subject to any disclaimer, the term of this patent is extended or adjusted under 35 U.S.C. 154(b) by 183 days.

(21) Appl. No.: 14/391,148

(22) PCT Filed: Sep. 20, 2012

(86) PCT No.: PCT/CN2012/081700
§ 371 (c)(1),
(2) Date: Oct. 7, 2014

(87) PCT Pub. No.: WO2013/149454
PCT Pub. Date: Oct. 10, 2013

(65) Prior Publication Data
US 2015/0068027 A1    Mar. 12, 2015

(30) Foreign Application Priority Data

Apr. 7, 2012 (CN) .......................... 2012 1 0099790

(51) Int. Cl.
*H04R 31/00* (2006.01)
*H04R 7/16* (2006.01)
(Continued)

(52) U.S. Cl.
CPC ................ *H04R 31/00* (2013.01); *H04R 7/16* (2013.01); *H04R 7/18* (2013.01); *H04R 7/22* (2013.01);
(Continued)

(58) Field of Classification Search
CPC ..... H04R 31/00; H04R 31/003; H04R 31/006; H04R 7/16; H04R 7/18; H04R 7/22; C08L 67/02; Y10T 29/49005; Y10T 29/4902
See application file for complete search history.

(56) References Cited

U.S. PATENT DOCUMENTS 4,379,039 A * 4/1983 Fujimoto ................ C08L 67/02
156/332
2002/0100635 A1* 8/2002 Inoue ................... H04R 31/003
181/167
(Continued)

FOREIGN PATENT DOCUMENTS

CN        102271296 A       12/2011
CN        102340711 A        2/2012
(Continued)

OTHER PUBLICATIONS

Machine Translation (English) of Japanese Patent Publication JP 2005-136652, May 2016.*

(Continued)

*Primary Examiner* — A. Dexter Tugbang

(57) ABSTRACT

Provided is an assembling method for a micro-loudspeaker assembly. The method comprises the steps of: (a) preparing a chuck ring material plate and a vibrating diaphragm material plate, and stamping a number of chuck ring inner holes in the chuck ring material plate; (b) coating an adhesive on the upper surface of the chuck ring material plate stamped with the chuck ring inner holes; (c) bonding the vibrating diaphragm material plate to the upper surface of the chuck ring material plate coated with an adhesive; (d) downwards stamping the part of the vibrating diaphragm material plate corresponding to the chuck ring inner holes into the central part of a vibrating diaphragm; and (e) stamping to form the outer edge of the assembly around the chuck ring inner holes, and removing the assembly from the material plate.

8 Claims, 5 Drawing Sheets

(51) Int. Cl.
*H04R 7/18* (2006.01)
*H04R 7/22* (2006.01)
*C08L 67/02* (2006.01)

(52) U.S. Cl.
CPC .......... *H04R 31/003* (2013.01); *H04R 31/006* (2013.01); *C08L 67/02* (2013.01); *Y10T 29/4902* (2015.01); *Y10T 29/49005* (2015.01)

(56) References Cited

U.S. PATENT DOCUMENTS

2006/0249327 A1* 11/2006 Sato .................... H04R 31/003
 181/167
2007/0289120 A1* 12/2007 Kishi .................. H04R 31/006
 29/594

FOREIGN PATENT DOCUMENTS

| CN | 102625226 A | | 8/2012 |
|---|---|---|---|
| JP | 2005-136652 A | | 5/2005 |
| JP | 2006211732 A | * | 8/2006 |

OTHER PUBLICATIONS

Machine Translation (English) of Japanese Patent Publication JP 2006-211732, May 2016.*
International Search Report for PCT/CN2012/081700 filed on Sep. 20, 2012.

* cited by examiner

ASSEMBLING METHOD FOR MICRO-LOUDSPEAKER ASSEMBLY

TECHNICAL FIELD

The invention relates to an assembling method for a loudspeaker, and more specifically, to an assembling method for a micro-loudspeaker assembly.

BACKGROUND

The micro-loudspeaker in the prior art comprises a vibrating system, a magnetic circuit system and a casing for accommodating and mounting the vibrating system and the magnetic circuit system, wherein the vibrating system comprises a vibrating diaphragm and a voice coil integrated together, the vibrating diaphragm is fixedly combined with the casing at one side of the edge and is fixed by a chuck ring at the other side, and the chuck ring and the casing are located on the two sides of the edge of the vibrating diaphragm respectively to fix the vibrating diaphragm.

FIG. 4 is an assembly schematic drawing of the vibrating diaphragm and chuck ring assembly in the prior art. As illustrated in FIG. 4, in the conventional process for the micro-loudspeaker configured above, the vibrating diaphragm 20 and the chuck ring 10 are formed separately and machined into separate parts, and bonded together to form a vibrating diaphragm and chuck ring assembly 4, which is then mounted in the casing.

FIG. 5 is an assembly schematic drawing of the electric connecting part, vibrating diaphragm and chuck ring assembly in the prior art. As illustrated in FIG. 5, in a micro-loudspeaker of another structure, the electric connecting part 30 for connecting the internal circuit of the micro-loudspeaker and the external circuit has an integrated flexible printed circuit board (FPCB) structure comprised of an annular first electric connecting portion 301 and a second electric connecting portion 302 provided outside the first electric connecting portion 301, the first electric connecting portion 301 is mounted between the edge of the vibrating diaphragm 20 and the casing to electrically connect to the lead of the internal voice coil, and the second electric connecting portion 302 extends to the outside of the micro-loudspeaker to be connected with an external circuit. In the conventional process for the micro-loudspeaker configured above, the electric connecting part 30, the vibrating diaphragm 20 and the chuck ring 10 are molded separately and machined into separate parts, and bonded together to form an electric connecting part, vibrating diaphragm and chuck ring assembly 5, which is then mounted in the casing.

In the above assembly process, the bonding process of the separate parts is done manually, requiring a lot of manual operation, and as respective parts are very small and not easy to handle, production efficiency is low.

SUMMARY OF THE INVENTION

In view of the above problems, one objective of the present invention is to provide an assembling method for a micro-loudspeaker assembly which can simplify the fabrication process of the assembly, save manual work, and increase the production efficiency.

In order to solve the above technical problem, the technical solution of the present invention is an assembling method for micro-loudspeaker assembly, comprising the steps of:

(a) stamping out a number of inner holes of chuck ring in the material plate of chuck ring, the shape of each of the inner holes of chuck ring the same as the shape of the edge of the central part of a vibrating diaphragm;

(b) coating an adhesive on the upper surface of the material plate of chuck ring stamped with the inner holes of chuck ring;

(c) bonding the material plate of vibrating diaphragm to the upper surface of the material plate of chuck ring coated with an adhesive;

(d) downwardly stamping the part of the material plate of vibrating diaphragm aligning with the inner holes of chuck ring so as to form the central part of the vibrating diaphragm; and (e) stamping the part around the inner holes of chuck ring to form the outer edge of the assembly, and removing the assembly from the material plates.

Where in step (a), a number of positioning holes are stamped in the periphery of the material plate of chuck ring.

As a preferred technical solution, in step (a), an FPCB integrated with several electric connecting parts is prepared, and inner holes of electric connecting part are stamped out in the FPCB; between the steps (d) and (e), an adhesive is coated on the surface of the FPCB stamped with the inner holes of electric connecting part, and then the FPCB is bonded to the upper surface of the material plate of vibrating diaphragm, and the inner holes of electric connecting part align with the inner holes of chuck ring in a one-to-one way.

As another preferred technical solution, in step (a), inner holes of electric connecting part are stamped in the FPCB integrated with several electric connecting parts; and between the steps (c) and (d), an adhesive is coated on the upper surface of the FPCB stamped with the inner holes of electric connecting part, and then the FPCB is bonded to the upper surface of the material plate of vibrating diaphragm, and the inner holes of electric connecting part align with the inner holes of chuck ring in a one-to-one way.

With the above technical solution, the present invention achieves the following effects:

1. In the conventional process, firstly, a vibrating diaphragm and a chuck ring are formed separately, and then an adhesive is coated on the surface of the chuck ring, which is then bonded with the edge of the vibrating diaphragm to form a vibrating diaphragm and chuck ring assembly. In the present invention, a material plate of chuck ring which can be made into a plurality of chuck rings and a material plate of vibrating diaphragm which can be made into a plurality of vibrating diaphragms are prepared, and a number of inner holes of chuck ring are stamped out in the material plate of chuck ring, and then the material plate of chuck ring stamped with holes is bonded to the material plate of vibrating diaphragm, the part of the material plate of vibrating diaphragm aligning with the inner hole of chuck ring is stamped into the central part of the vibrating diaphragm, and the periphery of the inner holes of chuck ring is stamped to form the outer edge of the vibrating diaphragm and chuck ring assembly, and the assembly is removed from the two bonded material plates to obtain an assembly product. With the above process, the conventional process of forming two parts separately and bonding and assembling each assembly manually is improved, thereby improving automaticity and simplifying the manufacturing process for the assemblies, and each time more than one assembly products can be formed on the material plates of vibrating diaphragm and chuck ring which are composited together, thereby saving the manual work and improving production efficiency significantly.

2. In the conventional process, firstly, an electric connecting part, a vibrating diaphragm and a chuck ring are formed separately, and then an adhesive is coated on the surface of the chuck ring which is then bonded with one side of the edge of the vibrating diaphragm, an adhesive is coated on the surface of the electric connecting part which is then bonded with another side of the edge of the vibrating diaphragm to form an electric connecting part, vibrating diaphragm and chuck ring assembly. In the present invention, a material plate of chuck ring which can be made into a plurality of chuck rings, a material plate of vibrating diaphragm which can be made into a plurality of vibrating diaphragms and an FPCB which can be made into a plurality of electric connecting parts are prepared, and a number of inner holes of chuck ring are stamped out in the material plate of chuck ring, and a number of inner holes of electric connecting part are stamped out in the FPCB, and then the material plate of vibrating diaphragm is bonded to the upper surface of the material plate of chuck ring stamped with holes, and then one of the following two steps is performed: 1) firstly, the part of the material plate of vibrating diaphragm aligning with the inner hole of chuck ring is stamped into the central part of the vibrating diaphragm, and then the FPCB stamped is bonded to the upper surface of the material plate of vibrating diaphragm such that the inner holes of electric connecting part align with the inner holes of chuck ring in a one-to-one way, and then the periphery of the inner hole of chuck ring is stamped to form the outer edge of the electric connecting part, vibrating diaphragm and chuck ring assembly, and the assembly is released from the three bonded material plates to obtain an assembly product; 2) firstly, the FPCB stamped is bonded to the upper surface of the material plate of vibrating diaphragm such that the inner holes of electric connecting part align with the inner holes of chuck ring in a one-to-one way, and then the part of the material plate of vibrating diaphragm aligning with the inner hole of chuck ring is stamped so as to form the central part of the vibrating diaphragm, and the periphery of the inner hole of chuck ring is stamped to form the outer edge of the electric connecting part, vibrating diaphragm and chuck ring assembly, the assembly is released from the three bonded material plates to obtain an assembly product. With the above two processes, the conventional process of forming three parts separately and bonding and assembling each assembly manually is improved, thereby improving automaticity and simplifying the manufacturing process for the assemblies, and each time more than one assembly products can be formed on the three bonded material plates on which three parts are composited together, thereby saving manual work and improving production efficiency significantly.

In order to achieve the above and related objectives, one or more aspects of the present invention comprise the features detailed below and indicated particularly in the claims. Some exemplary aspects of the present invention are described in details by the description below and the accompanying drawings. However, these aspects only indicate some implementations of various implementations of the present invention. In addition, the present invention is intended to include these aspects and the equivalents thereof.

BRIEF DESCRIPTION OF THE DRAWINGS

By referring to the descriptions of the accompanying drawings and the claims, and with a full understanding of the present invention, other purposes and results of the present invention will be more clearly and easily understood. In the drawings:

In the figures, 1. material plate of chuck ring, 10. chuck ring, 11. inner hole of chuck ring, 2. material plate of vibrating diaphragm, 20. vibrating diaphragm, 21. central part of vibrating diaphragm, 3. FPCB, 30. electric connecting part, 301. first electric connecting portion, 302. second electric connecting portion, 31. inner hole of electric connecting part, 4. vibrating diaphragm and chuck ring assembly, 41. outer edge of vibrating diaphragm and chuck ring assembly, 5. electric connecting part, vibrating diaphragm and chuck ring assembly, 51. outer edge of electric connecting part, vibrating diaphragm and chuck ring assembly.

Similar signs in all figures indicate similar or corresponding features or functions.

DETAILED DESCRIPTION

Various specific details are set forth in the following description to comprehensively understand one or more embodiments for sake of illustration. However, it is obvious that these embodiments can be implemented without such specific details. In other examples, known structures and devices are showed by block diagrams to facilitate describing one or more embodiments.

Particular embodiments of the present invention are described in connection with the accompanying drawings.

Embodiment 1

Figure 1:
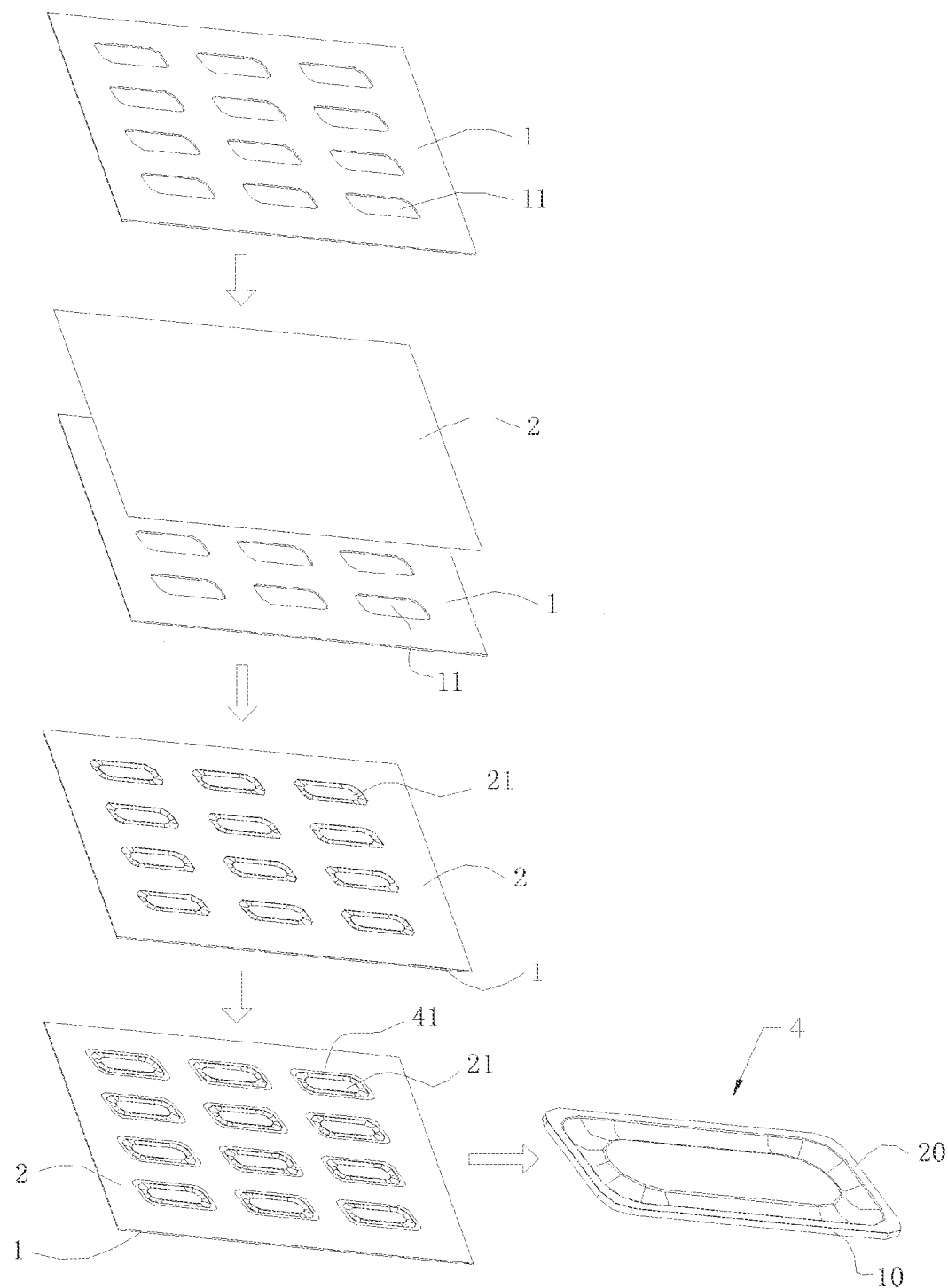
FIG. 1 is an assembly schematic drawing of embodiment 1 of the present invention.

FIG. 1 is an assembly schematic drawing of embodiment 1 of the present invention. As illustrated in FIG. 1, in the assembling method for micro-loudspeaker assembly provided by Embodiment 1, the finally assembled micro-loudspeaker assembly comprises a vibrating diaphragm 20 and a chuck ring 10 which is bonded with the edge of the vibrating diaphragm 20 together, while the side of the edge of the vibrating diaphragm 20 which is not bonded contacts with the casing of the micro-loudspeaker directly, and the chuck ring 10 and the casing are located on the two side surfaces of the edge of the vibrating diaphragm 20 respectively to fix the vibrating diaphragm 20.

The assembling method of the above assemblies in the present embodiment comprises the following steps:

(a) preparing a material plate 1 of chuck ring which can be made into a plurality of chuck rings 10 and a material plate of vibrating diaphragm 2 which can be made into a plurality of vibrating diaphragms 20, and stamping out a number of inner holes 11 of chuck ring in the material plate 1 of chuck ring, the shape of each of the inner holes 11 of chuck ring the same as the shape of the edge of the central part of a vibrating diaphragm.

Wherein, the material plate 1 of chuck ring can be made of metal material or plastic material.

Furthermore, while the inner holes 11 of chuck ring are stamped out in the material plate 1 of chuck ring, positioning holes (not illustrated) are stamped out in the periphery of the material plate 1 of chuck ring so as to facilitate positioning the material plate 1 of chuck ring during the subsequent stamping.

(b) coating an adhesive on the upper surface of the material plate 1 of chuck ring stamped with the inner holes 11 of chuck ring. The following process is performed: firstly, the material plate 1 of chuck ring is fixed on a positioning plate, and then an adhesive is printed around the inner holes 11 of chuck ring of the material plate of chuck ring by screen printing.

(c) bonding the material plate 2 of vibrating diaphragm to the upper surface of the material plate 1 of chuck ring coated with an adhesive, stamping and then solidifying.

(d) stamping two material plates bonded together, and downwardly stamping the part of the material plate of vibrating diaphragm aligning with the inner hole 11 of chuck ring so as to form the central part 21 of the vibrating diaphragm.

(e) stamping the two material plates bonded together again, and stamping around the inner holes 11 of chuck ring to form the outer edge 41 of the vibrating diaphragm and chuck ring assembly, and removing the vibrating diaphragm and chuck ring assembly 4 from the two material plates, so as to obtain an assembly product.

With the above process, the conventional process of forming two parts separately and bonding and assembling each component manually is improved, thereby improving automaticity and simplifying the manufacturing process for the assemblies, and each time more than one assembly products can be formed on the two composited material plates, thereby saving a lot of manual work and improving production efficiency significantly.

Embodiment 2

Figure 2:
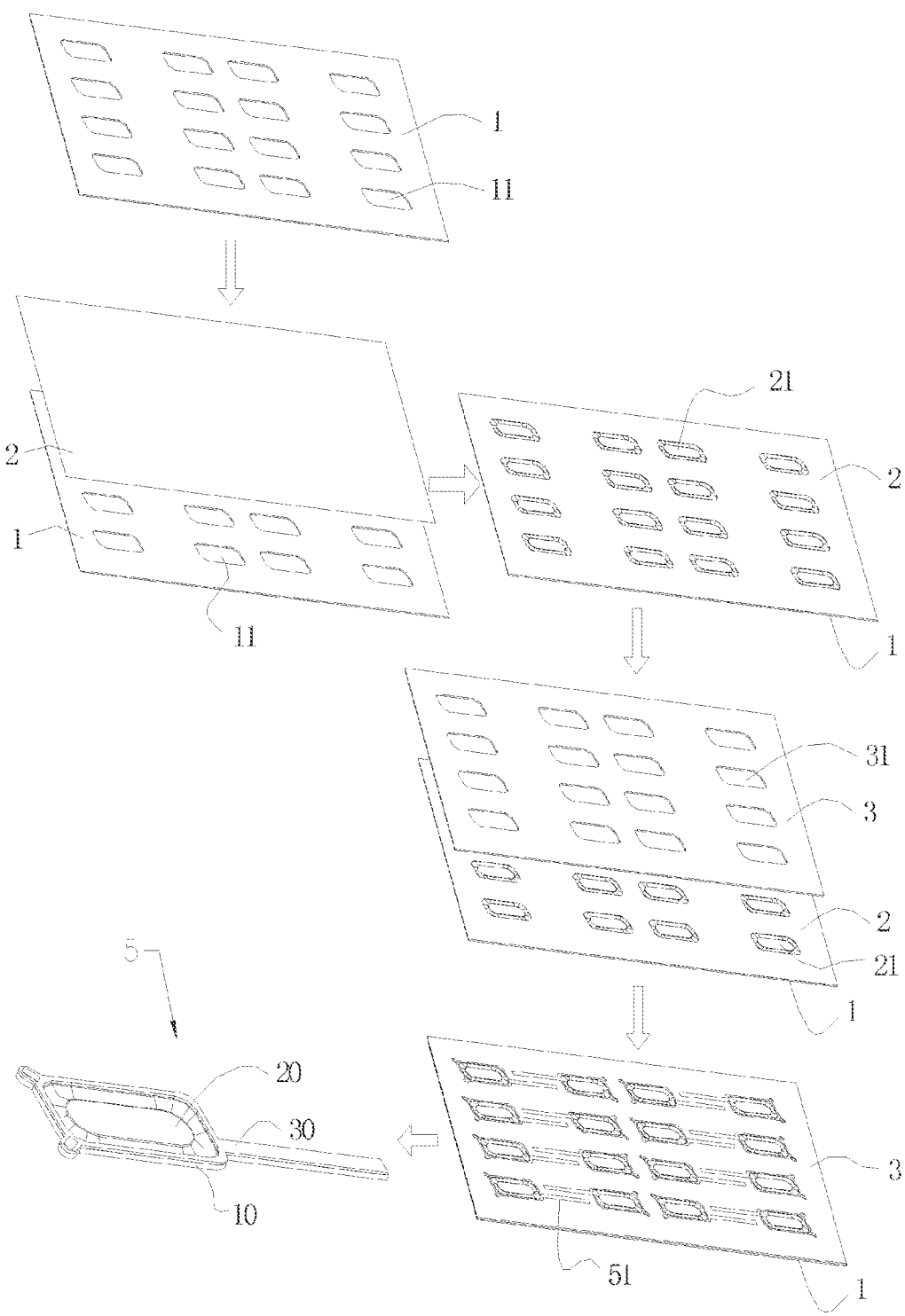
FIG. 2 is an assembly schematic drawing of embodiment 2 of the present invention.

FIG. 2 is an assembly schematic drawing of embodiment 2 of the present invention. As illustrated in FIG. 2, in the assembling method for micro-loudspeaker assembly provided by Embodiment 2, the finally assembled micro-loudspeaker assembly comprises an electric connecting part 30, a vibrating diaphragm 20 and a chuck ring 10 which are bonded together successively, wherein the electric connecting part 30 has an integrated FPCB structure comprised of an annular first electric connecting portion 301 and a second electric connecting portion 302 provided outside the first electric connecting portion 301, the first electric connecting portion 301 is mounted between the edge of the vibrating diaphragm 20 and the casing of the loudspeaker, and optionally a pad is arranged on the first electric connecting portion 301 based on the outlet position of the leads of the voice coil, and the second electric connecting portion 302 extends to the outside of the micro-loudspeaker to be connected with an external circuit. The chuck ring 10 is used for fixing the vibrating diaphragm 20.

The assembling method of the above assemblies in the present embodiment comprises the following steps:

(a) preparing a material plate 1 of chuck ring which can be made into a plurality of chuck rings 10, a material plate 2 of vibrating diaphragm which can be made into a plurality of vibrating diaphragms 20, and an FPCB 3 integrated with several electric connecting parts 30.

Stamping out several inner holes 11 of chuck ring in the material plate 1 of chuck ring, the shape of each of the inner holes 11 of chuck ring the same as the shape of the edge of the central part of the vibrating diaphragm; stamping out inner holes 31 of electric connecting part in the FPCB 3 which may be the same with, or slightly larger than the inner holes 11 of chuck ring.

Wherein, the material plate 1 of chuck ring can be made of metal material or plastic material.

Furthermore, while the inner holes 11 of chuck ring are stamped out in the material plate 1 of chuck ring, positioning holes (not illustrated) are stamped out in the periphery of the material plate 1 of chuck ring so as to facilitate positioning the material plate 1 of chuck ring during the subsequent stamping. While the inner holes 31 of electric connecting part are stamped out in the FPCB 3, positioning holes (not illustrated) are stamped out in the periphery of the FPCB 3 so as to facilitate positioning the FPCB 3 during the subsequent stamping.

(b) coating an adhesive on the upper surface of the material plate 1 of chuck ring stamped with the inner holes 11 of chuck ring. The following process is performed: firstly, the material plate 1 of chuck ring is fixed on a positioning plate, and then an adhesive is printed around the inner holes 11 of chuck ring of the material plate of chuck ring by screen-printing.

(c) bonding the material plate 2 of vibrating diaphragm to the upper surface of the material plate 1 of chuck ring coated with an adhesive, stamping and solidifying.

(d1) stamping the two material plates bonded together, and downwardly stamping the part of the material plate of vibrating diaphragm aligning with the inner hole 11 of chuck ring so as to form the central part 21 of the vibrating diaphragm.

(d2) coating an adhesive on the surface of the FPCB 3 stamped with the inner holes 31 of electric connecting part, the coating process thereof being the same as that of the material plate 1 of chuck ring. Then the FPCB 3 is bonded to the upper surface of the material plate 2 of vibrating diaphragm such that the inner holes 31 of electric connecting part align with the inner holes 11 of chuck ring in a one-to-one way, and is stamped and then solidified.

(e) stamping the three material plates bonded together again, and stamping around the inner holes 11 of chuck ring to form the outer edge 51 of the electric connecting part, vibrating diaphragm and chuck ring assembly, and releasing the electric connecting part, vibrating diaphragm and chuck ring assembly 5 from the three material plates, so as to obtain an assembly product.

With the above process, the conventional process of forming three parts separately and bonding and assembling each assembly manually is improved, thereby improving automaticity and simplifying the manufacturing process for the assemblies, and each time more than one assembly products can be formed on the three material plates which are composited together, thereby saving a lot of manual work and improving production efficiency significantly.

Embodiment 3

Figure 3:
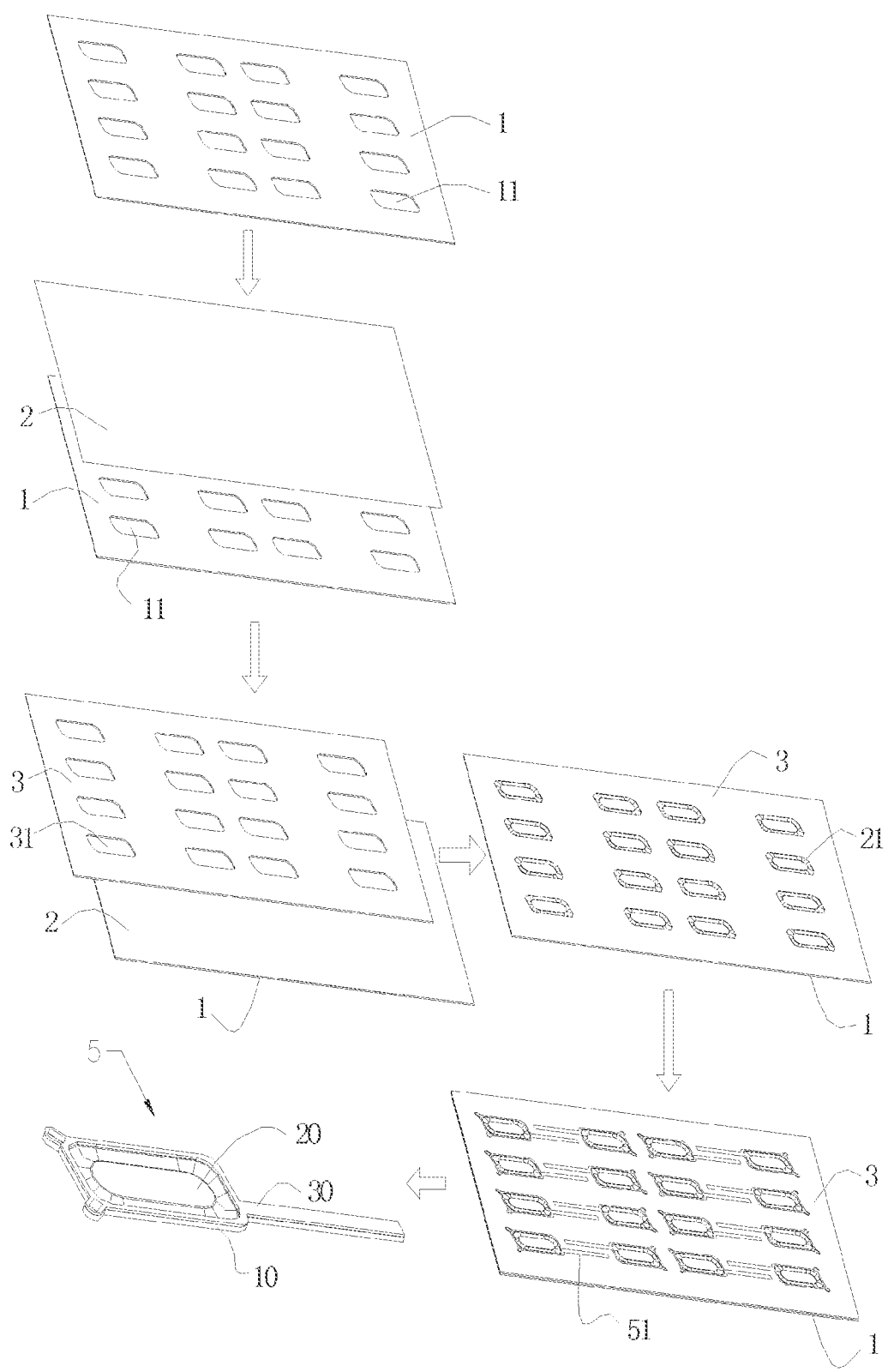
FIG. 3 is an assembly schematic drawing of embodiment 3 of the present invention.
Figure 4:
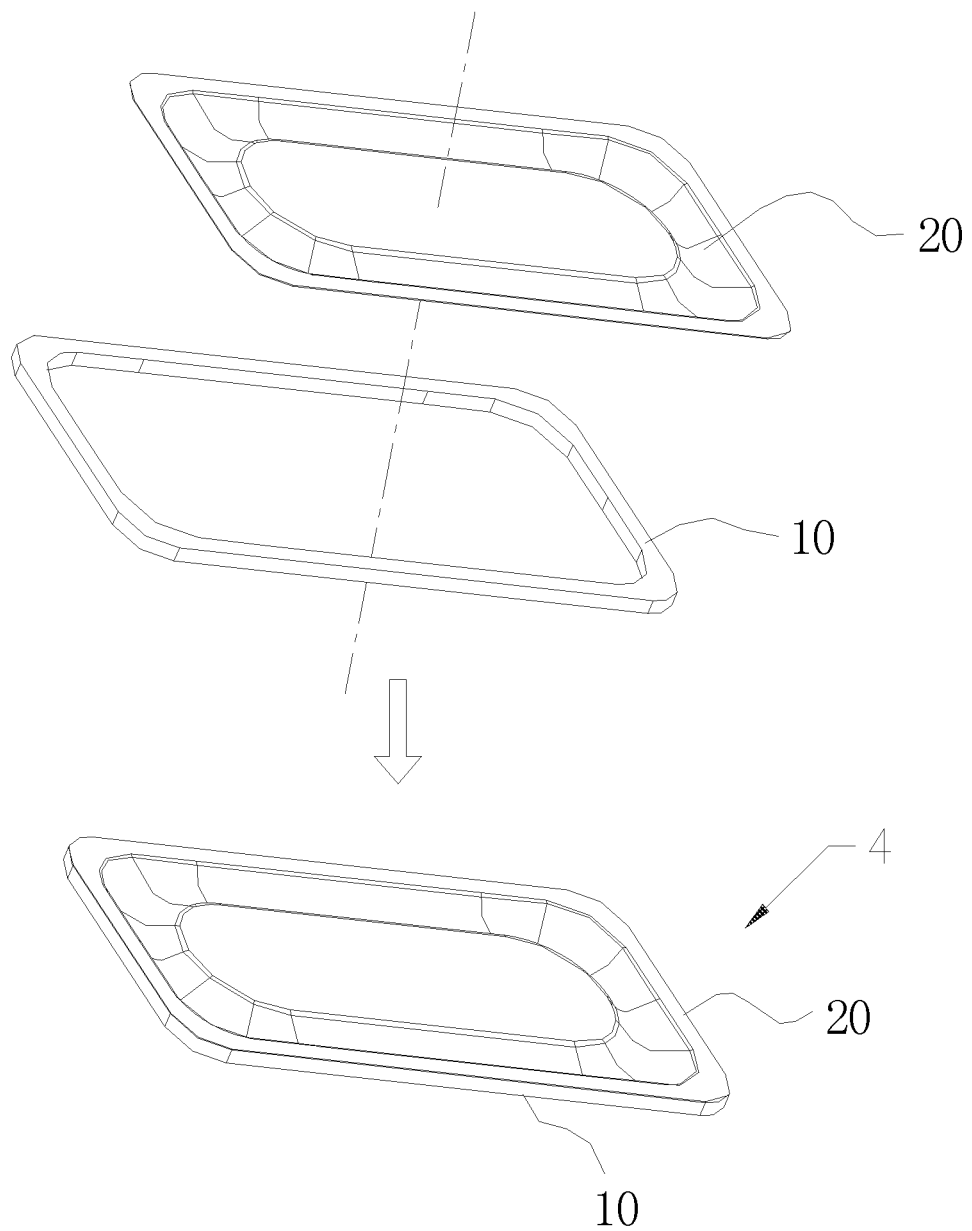
FIG. 4 is an assembly schematic drawing of the vibrating diaphragm and chuck ring assembly in the prior art.
Figure 5:
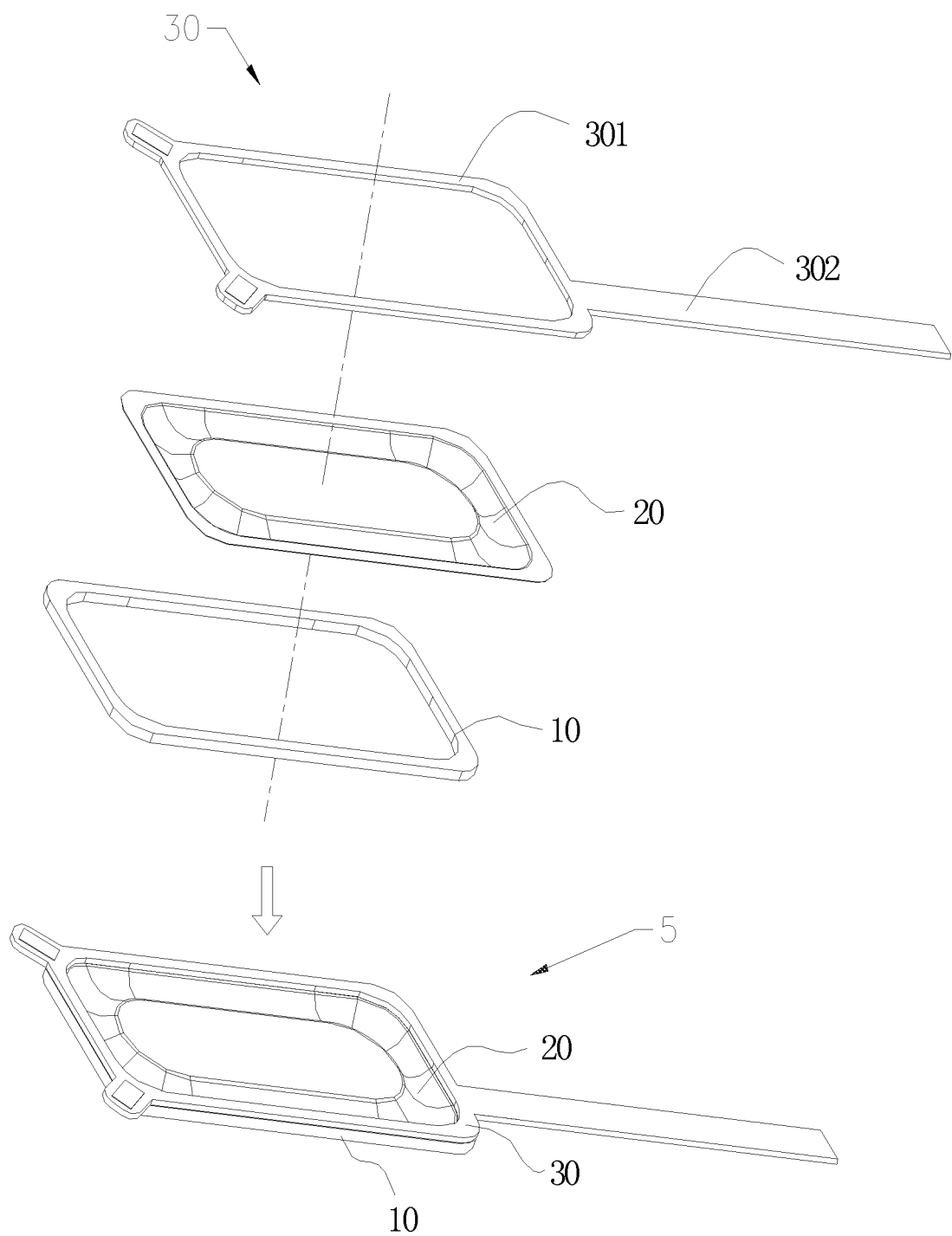
FIG. 5 is an assembly schematic drawing of the electric connecting part, vibrating diaphragm and chuck ring assembly in the prior art.

FIG. 3 is an assembly schematic drawing of embodiment 3 of the present invention. As illustrated in FIG. 3, in the assembling method for micro-loudspeaker assembly provided by Embodiment 3, the finally assembled micro-loudspeaker assembly thereof has the same structure as the micro-loudspeaker assembly provided by Embodiment 2.

The assembling method of the above assemblies in the present embodiment comprises the following steps:

The steps (a), (b) and (c) of Embodiment 3 are the same as those of Embodiment 2.

After the step (c), an adhesive is coated on the upper surface of the FPCB 3 stamped with the inner holes 31 of electric connecting part. Then the FPCB 3 is bonded to the upper surface of the material plate 2 of vibrating diaphragm such that the inner holes 31 of electric connecting part align with the inner holes 11 of chuck ring in a one-to-one way, and is stamped and solidified.

(d) stamping the three material plates bonded together, and downwardly stamping the part of the material plate of vibrating diaphragm aligning with the inner hole 11 of chuck ring so as to form the central part 21 of the vibrating diaphragm.

(e) stamping the three material plates bonded together again, and stamping around the inner holes 11 of chuck ring to form the outer edge 51 of the electric connecting part, vibrating diaphragm and chuck ring assembly, and releasing the electric connecting part, vibrating diaphragm and chuck ring assembly 5 from the three material plates, so as to obtain an assembly product.

Similarly, with the above process, automaticity is improved and the manufacturing process for the assemblies is simplified, and each time more than one assembly products can be formed on the three material plates which are composited together, thereby saving a lot of manual work and improving production efficiency significantly.

With the above teaching of the present invention, various improvements and variants can be made by those skilled in the art based on the above embodiments which fall into the scope of the present invention. It will be understood by those skilled in the art that the above specific description aims at a better understanding of the present invention, and the scope of the present invention is defined by the claims and their equivalents.

The invention claimed is:

1. An assembling method for micro-loudspeaker assemblies, the method comprising:
   (a) stamping out a plurality of inner holes of chuck rings in a chuck ring material plate, wherein shapes of the plurality of inner holes are the same as shapes of central parts of vibrating diaphragms;
   (b) coating an adhesive on an upper surface of the chuck ring material plate stamped with the inner holes of chuck rings;
   (c) bonding a vibrating diaphragm material plate to the upper surface of the chuck ring material plate coated with the adhesive;
   (d) downwardly stamping out a part of the vibrating diaphragm material plate aligning with the inner holes of chuck rings so as to form central parts of the vibrating diaphragms; and
   (e) stamping around the plurality of inner holes of chuck rings to form outer edges of the assemblies, and releasing the assemblies from the bonded material plates.

2. The assembling method for micro-loudspeaker assembly of claim 1, wherein in step (a), positioning holes are stamped out in the periphery of the chuck ring material plate.

3. The assembling method for micro-loudspeaker assembly of claim 1, wherein
   in step (a), a flexible printed circuit board (FPCB) integrated with several electric connecting parts is prepared, and inner holes of electric connecting part are stamped out in the FPCB; and
   between the steps (d) and (e), a second adhesive is coated on the surface of the FPCB stamped with the inner holes of electric connecting part, and then the FPCB is bonded to the upper surface of the vibrating diaphragm material plate, so that the inner holes of electric connecting part align with the inner holes of chuck rings in a one-to-one way.

4. The assembling method for micro-loudspeaker assembly of claim 3, wherein in step (a), positioning holes are stamped out in the periphery of the chuck ring material plate and the FPCB.

5. The assembling method for micro-loudspeaker assembly of claim 1, wherein
   in step (a), inner holes of electric connecting part are stamped out in a flexible printed circuit board (FPCB) integrated with several electric connecting parts; and
   between the steps (c) and (d), a second adhesive is coated on the surface of the FPCB stamped with the inner holes of electric connecting part, and then the FPCB is bonded to the upper surface of the vibrating diaphragm material plate, so that the inner holes of electric connecting part align with the inner holes of chuck rings in a one-to-one way.

6. The assembling method for micro-loudspeaker assembly of claim 5, wherein in step (a), positioning holes are stamped out in the periphery of the chuck ring material plate and the FPCB.

7. The assembling method for micro-loudspeaker assembly of claim 1, wherein
   in step (b), a third adhesive is printed on the periphery of the inner holes of chuck ring of the chuck ring material plate by screen-printing.

8. The assembling method for micro-loudspeaker assembly of claim 1, wherein the chuck ring material plate is made of metal material or plastic material.

\* \* \* \* \*